March 3, 1959
C. R. STEWART
2,875,548
FISHLINE CASTING DEVICE
Filed Jan. 20, 1955
2 Sheets-Sheet 1
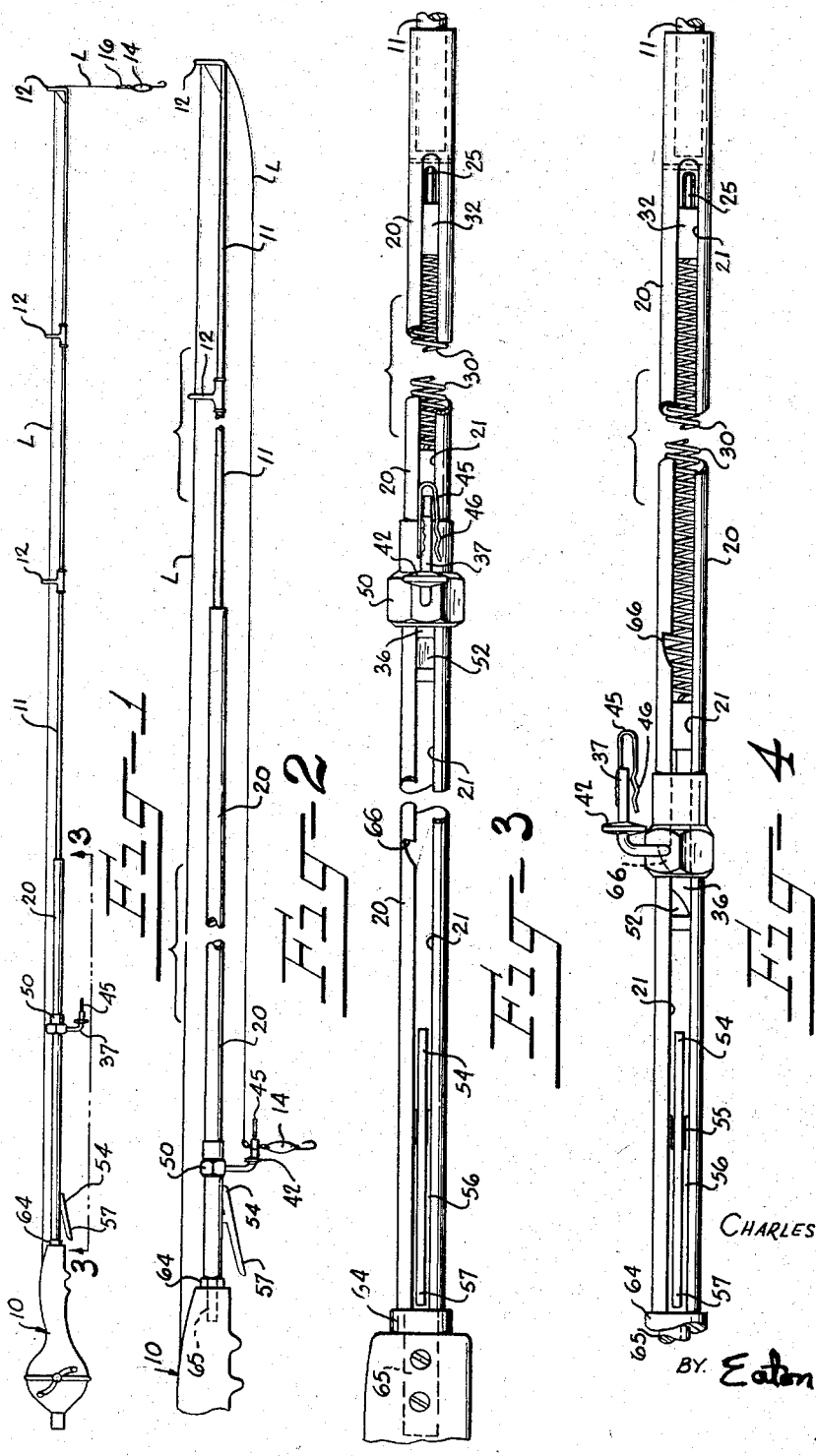
CHARLES R. STEWART,
INVENTOR·
BY Eaton + Bell
ATTORNEYS

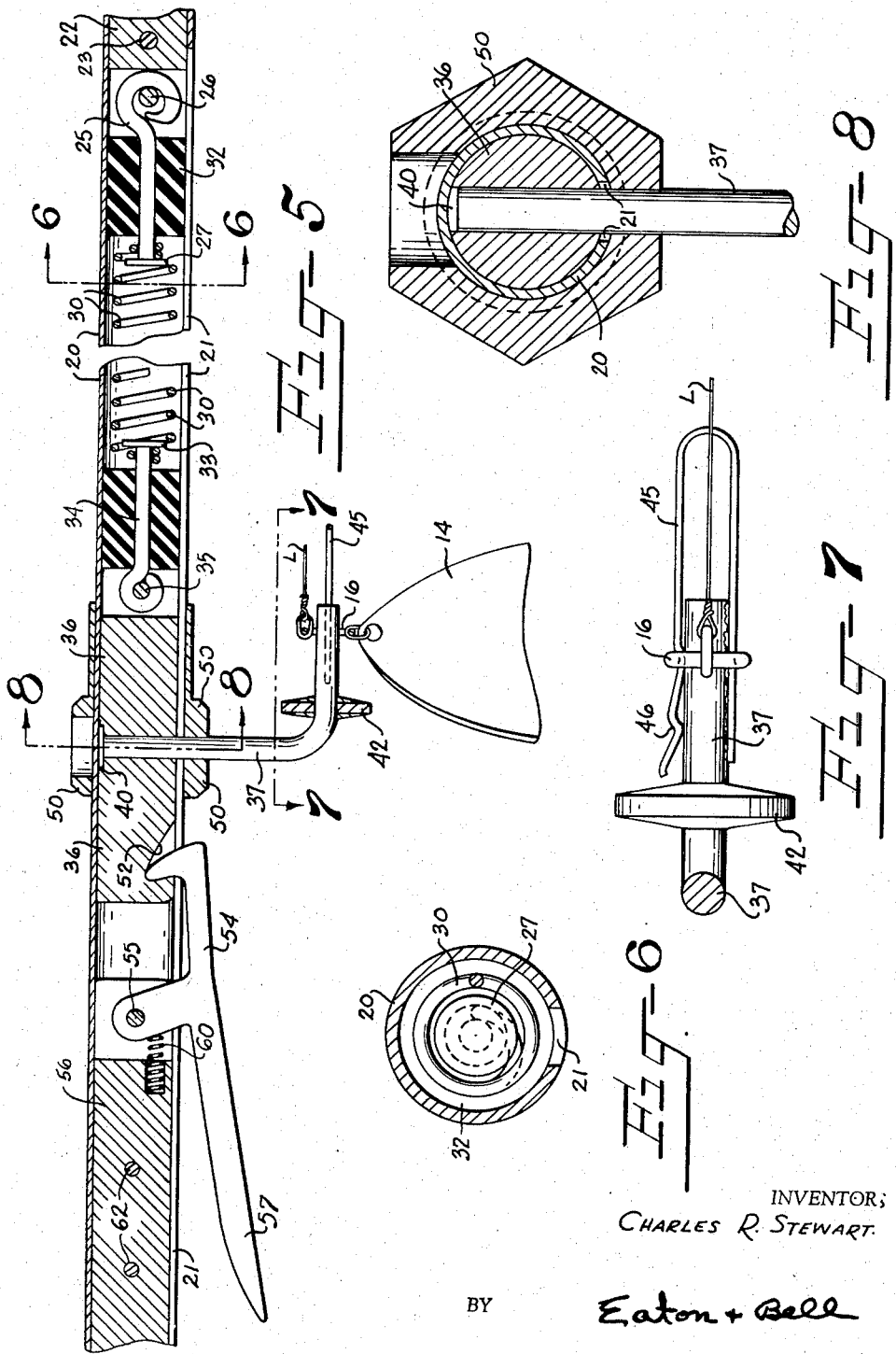

United States Patent Office 2,875,548
Patented Mar. 3, 1959

2,875,548
FISHLINE CASTING DEVICE
Charles R. Stewart, Charlotte, N. C.

Application January 20, 1955, Serial No. 483,037

1 Claim. (Cl. 43—19)

This invention relates to fishline casting devices and more particularly to a device for casting a fish bait carried by the pole.

Heretofore, the conventional manner of casting a fishline is to swing the rod in an arc above the fisherman's head to cause the fish bait to be cast or launched by the snap action in the rod as it is brought forward. In many instances this action is not permitted because of hanging trees, limbs or other obstructions or limited spaced in which to swing the rod. A great amount of skill is required in order to make the fish bait land on the water in the desired spot or location and also a great amount of skill is required so that the reel does not backlash to entangle or ensnare the fishing line.

It is therefore an object of this invention to provide a device for launching or casting a fishing bait which requires no skill in operating other than aiming the tip of the rod at the point or position desired to cast the bait and which may be used in a very limited space without danger of entangling the fishing rod in other objects or endangering spectators.

It is another object of this invention to provide a fishline casting device which is attached to a conventional fishing casting reel and has a fishing rod attached in its free end to thus provide a launching attachment on a conventional rod and reel which is light in weight and easily operable without any particular skill.

It is another object of this invention to provide a fishline casting device which is tubular in cross-section and provided with internal resilient means for launching the fishing bait. Means are also provided for varying the strength of the resilient member when launching the fishing bait to thereby vary the distance which the fishing bait or lure is cast.

Some of the objects of the invention having been stated, other objects will appear as the description proceeds, when taken in connection with the accompanying drawings, in which—

Figure 1 is a side elevation of a fishing rod and reel with the fishline casting device interposed therebetween and showing the casting device in uncocked position;

Figure 2 is an enlarged view similar to Figure 1 except showing only a portion of the reel handle, the rod being broken away and showing the casting device in cocked position;

Figure 3 is an enlarged elevation view showing the lower side of a portion of Figure 1 taken substantially along the line 3—3 in Figure 1 with parts broken away;

Figure 4 is a view similar to Figure 3 but showing some of the parts in different positions;

Figure 5 is an enlarged longitudinal vertical sectional view through the casting device and showing the casting device in cocked position;

Figure 6 is a transverse vertical sectional view at an enlarged scale and being taken substantially along the line 6—6 in Figure 5;

Figure 7 is an enlarged fragmentary plan view taken substantially along the line 7—7 in Figure 5;

Figure 8 is a transverse vertical sectional view at an enlarged scale and being taken substantially along the line 8—8 in Figure 5.

Referring more specifically to the drawings, the numeral 10 indicates a conventional spinning reel (Figure 1) and although a spinning type reel is shown in association with this invention, it is to be understood that any type of spool reel could be used with this casting device. A conventional rod 11 is provided at the opposite end of the casting device and has suitable line guiding eyes 12 secured thereto for guiding the fishline along the rod 11. A fishline L has a suitable lure or fish bait 14 secured at its free end (Figures 1, 2 and 5) as by a ring 16, the purpose of which will be later described.

The fishline casting device comprises a tubular shank 20 having a longitudinal extending opening 21 therein which extends from the end adjacent the reel 10 to within a relatively short distance from the rod holding end of the tubular member 20. The rod holding end of the tubular member 20 is closed by a block 22 which fits in the end of the tubular member 20 and is suitably secured therein as by a transversely extending pin 23 (Figures 1, 2 and 5). The outer end of the block member 22 has a suitable bore therein for receiving the one end of the rod 11. The opposite or inner end of the block 22 is bifurcated to receive the hooked end of a spring anchor 25 (Figure 5) hooked around a transversely extending pin 26. The spring anchor 25 is provided with a head 27 around which one end of a tension spring 30 is tightly wound to fixedly secure the end of the spring 30 to the spring anchor 25. A resilient bumper of rubber, or the like, 32 surrounds the shank of the spring anchor 25 to provide a forward shock absorbing member.

The spring 30 extends rearwardly in the tubular member 20 and is secured to the head member 33 of a spring anchor 34 the opposite end of which surrounds and is hooked around a pin 35 fixedly secured transversely of the bifurcated end of an internal slide 36 which is adapted to have sliding movement along the inner walls of the tubular member 20. The internal slide 36 is provided with a downwardly extending launching arm 37 the upper end of which passes through the internal slide 36 and is prevented from rotation therein by a flattened head member 40 fitting in a cut out portion of the internal slide 36. The lower end of the launching arm 37 is turned at a right angle with respect to the upper end and has a circular guard 42 suitably secured thereto. The free end of the arm 37 is provided with a U-shaped ring retaining member 45 (Figure 7) having a pair of notches or detents 46 in one leg thereof and the other leg thereof being suitably secured to the launching arm 37. The U-shaped hook retaining member 45 is used to resiliently engage the ring 16 to thus resiliently hold the fish bait 14 in position on the horizontal portion of the launching arm 37 until a great enough force is exerted on the hook launching arm 37 to cause the ring 16 to become disengaged from the hook member 45.

An external guide 50 is provided to slidably engage the outer diameter of the tubular member 20 and which moves with the internal slide as the internal guide 36 is moved either manually or resiliently since the launching arm 37 passes through the external guide 50 as it extends downwardly through the opening or slot 21 in the tubular member 20. The rear end of the internal slide 36 is provided with a locking notch 52 (Figure 5) which is at times engaged by a locking lever 54 pivotally mounted as at 55 on a pin fixed in the bifurcated front end of inner end block 56. The lever or trigger 54 has a tail portion 57 normally urged outwardly from the tubular member 20 by a compression spring 60, one end of which is embedded in the block 56 and the opposite end of which engages the trigger 54. The block 56 is suitably secured in the tubular member 20 by any suitable means such as a pair of transversely extending pins 62. The block 56 extends to the rear or inner end of the tubular member 20 and has an enlarged collar portion 64 thereon, Figures 1, 2 and 3 and a reduced end portion 65 suitably secured in the handle portion of the spinning reel 10. One edge of the slot 21 in the tubular member 20 is provided with a plurality of notches 66 spaced along the slot 21 (Figures 3 and 4).

In operation, upon the maximum power being desired in launching the casting device, the fisherman would merely pull on the external guide 50 and the launching arm 37 to move the same along the tubular member 20 towards the reel 10 until the notch 52 in the internal slide 36 is engaged and held by the latch portion of the trigger 54 (Figure 5). The locking mechanism on the reel 10 is then released so that the ring 16 on the fishline L may be placed on the launching arm 37, in the manner shown in Figures 5 and 7. Upon aiming the tip of the rod 11 in the desired direction the tail 57 of the trigger 54 may be depressed with the fingers to release the internal slide 36 so that the tension spring 30 may quickly pull the internal slide 36 along the tubular member 20 and upon the tension spring becoming collapsed, the internal slide 36 as well as the launching arm 37 will be stopped very suddenly to thus send the fishing lure 14 forwardly at a great speed and to thus launch the same and pull the line L off the reel 10.

Upon desiring to reduce the amount of power exerted by the tension spring 30 when it is desired to cast the fishing bait or lure 14 a shorter distance, the external guide 50 may be moved rearwardly along the internal slide 36 until that portion of the launching arm 37 which passes through the opening 21 is opposite the desired one of the notches 66 cut in the side of the opening 21, at which time, the external guide 50 and the internal slide 36 may be rotated relative to the tubular member 20 to thus move that portion of the launching arm 37 which passes through the opening 21 into engagement with one of the notches 66 to substantially the position shown in Figure 4. Thus the tension on the tension spring 30 may be varied by locking the external guide in different positions along the tubular member 20. The ring 16 is then placed on the U-shaped member 45 to resiliently secure the bait 14 to the arm 37. In order to release the internal slide 36 so that the tension spring 30 may pull the launching arm 37 forwardly, it is merely necessary to rotate the launching arm 37 and external guide 50 relative to the tubular member 20 to thus move the arm 37 out of the notch 66 with which the arm 37 is in engagement to launch or cast the fishing line or fish bait 14.

It is thus seen that I have provided a fishline casting device comprising a tubular guide member having an internal slide member and a launching arm secured in said internal slide which is moved rearwardly or to cocked position manually and upon releasing the same, resilient means are provided for moving the launching arm and internal slide forwardly at a great speed to thus launch any desired type of artificial or live bait on a fishing line. Means are also provided for varying the force of the resilient launching means to thus cast the bait varying distances when desired.

In the drawings and specification, there has been set forth a preferred embodiment of the invention and although specific terms are employed, they are used in a generic and descriptive sense only and not for purposes of limitation, the scope of the invention being defined in the claim.

I claim:

A fishline casting device for a fishing rod and reel adapted to cast a fish bait comprising a tubular housing with an opening extending longitudinally thereof, a first head member fixed in one end of said tubular housing, a second head member fixed in the opposite end of said tubular housing, an internal slide slidably mounted in said tubular housing and having a locking notch therein in alinement with the opening in said tubular housing, a resilient member connected to one end of said internal slide and connected to said first head member to bias said internal slide toward said first head member, first latching means comprising a latch pivotally mounted in said second head member, said latch being engageable with the locking notch in said internal slide for maintaining said slide at a position adjacent one end of said opening and the resilient member under maximum tension, a launching arm embedded in said internal slide and extending outwardly from said internal slide and through the opening in said tubular housing, second latching means for maintaining said resilient member at intermediate positions along the length of said opening and the resilient member under corresponding tension, said second latching means comprising spaced locking notches cut in one side of said tubular housing along the opening in said housing, said launching arm being engageable with a selected one of said notches with movement along the opening in said housing and rotation of said internal slide, and resilient means on said launching arm for resiliently engaging said fish bait.

References Cited in the file of this patent
UNITED STATES PATENTS

| | | |
|---|---|---|
| 497,929 | Shumaker | May 23, 1893 |
| 2,225,719 | Shotton | Dec. 24, 1940 |
| 2,569,604 | Hall | Oct. 2, 1951 |

FOREIGN PATENTS

| | | |
|---|---|---|
| 58,068 | France | Sept. 21, 1953 |
| 571,323 | France | May 15, 1924 |